Nov. 23, 1926.
J. F. COX
1,608,482
HOUSEHOLD PARING KNIFE
Filed April 8, 1926
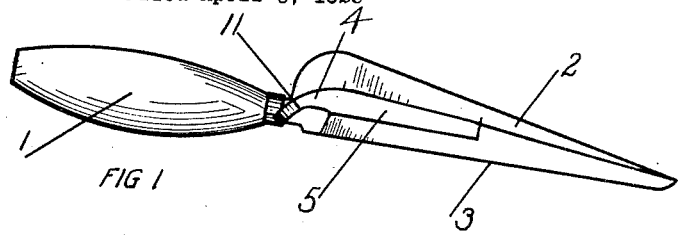
FIG 1
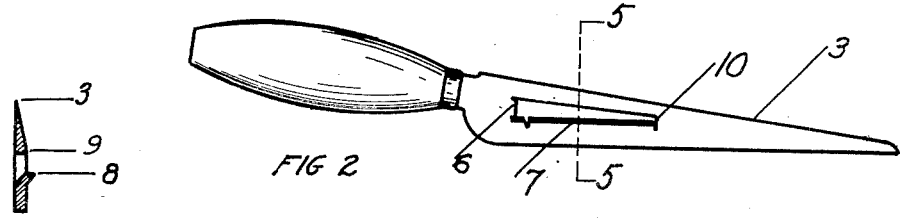
FIG 2
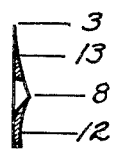
FIG 5
FIG 6
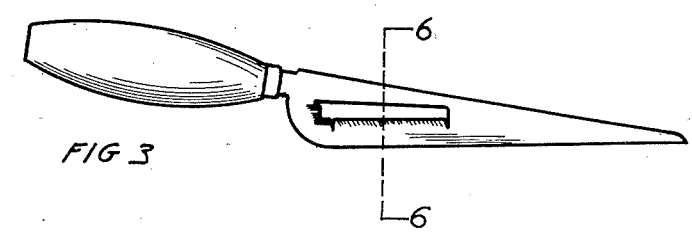
FIG 3
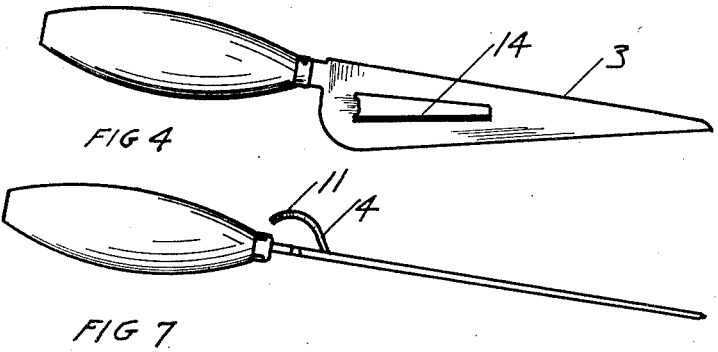
FIG 4
FIG 7
Inventor
JOHN F. COX
By Manuel C. Rosa
Attorney Patented Nov. 23, 1926.

1,608,482

UNITED STATES PATENT OFFICE.

JOHN F. COX, OF FALL RIVER, MASSACHUSETTS.

HOUSEHOLD PARING KNIFE.

Application filed April 8, 1926. Serial No. 100,666.

This invention relates to improvements in household paring knives and methods of making the same.

In developing my knife I have taken advantage of the fact that most all vegetables are spheroidal or ovoidal in form. By stamping out a slot in a blade or sheet of metal and pressing the slotted blade against the surface of a vegetable such as a potato or apple, a portion of the surface of the vegetable will be seen to protrude through the slot, the amount and extent of the surface which thus sticks up through the slot depending entirely upon the size of the slot. So that it will be seen that by sharpening one of the edges of the slot, the surface, which is the skin, may be cut away by running the knife over the surface.

The invention has for one of its objects the combination of several features into one article so that the same knife blade has a cutting edge, a paring edge, a gouging means and means for determining the size of the paring, all integrally associated.

Another object is the production of a paring knife simple in structure and so designed that the paring edge is visible to the user, a feature which is absent in most knives which have an additional edge for paring purposes.

A further object is to obtain a knife wherein a paring edge is provided which does not project away from the blade so that the knife may be employed for slicing vegetables without any waste due to strips slit or cut by a projecting edge.

A still further object is the production of a knife wherein the aforementioned functions may be utilized without changing the position of the knife in the hand.

Other objects will appear hereinafter from the detailed description provided.

Referring to the drawings:

Fig. 1 is a side elevational view of my improved knife showing the underside which contacts with the vegetable.

Fig. 2 is a top side elevational view of my knife after the slot and the edge of the slot are stamped from the blade, but before grinding on the underside to form a cutting edge.

Fig. 3 is a view similar to Fig. 2 showing the sharpened edge in the blade.

Fig. 4 represents a slight modification of my paring knife wherein the edge of the slot is sharpened directly without first stamping a portion thereof inwardly towards the other side of the knife.

Fig. 5 is a cross-sectional view taken along the lines 5—5 of Fig. 2, in the direction of the arrows and showing the portion of the edge which is stamped inwardly.

Fig. 6 is a similar view taken along lines 6—6 of Fig. 3 showing the turned edge of the slot after it is ground to a cutting edge; also showing the concave depression formed by the grinding thus providing a seat for the blade during the paring operation.

Fig. 7 is an edge view of the back of the knife more clearly showing the disposition of the gouger on the blade.

Similar numerals refer to similar parts throughout in the several views.

In the drawing, 1 indicates the handle to which is secured a blade 2, having a cutting edge 3. A tapered tongue-like portion 4 is stamped out of the blade, as shown in the drawing, and is bent towards the handle and its function will be more clearly set forth hereinafter. In outline the slot 5 thus formed in the knife is tapered towards the end of the knife for a purpose to be explained later.

About a quarter of an inch from the broad end 6 of the slot, or if a rectangular slot is used then the edge nearest the handle of the knife, a portion of the edge 7 of the slot nearest the back of the knife is stamped inwardly towards the same side of the knife blade where the tongue member 4 is located until the upper corner edge 8 is in alignment with the lower corner edge of the lower corner edge 9, of the quarter inch portion (as shown in Fig. 4).

The side of the knife blade on which the tongue member is positioned will be hereinafter referred to as the underside of the knife and the other side, the upper side.

The surface of the underside of the knife at the edge 7 of the slot is concavely ground until a cutting edge is provided as shown in Fig. 6. The grinding is so performed that the upper corner edge 8 becomes the paring edge. It should be borne in mind that the thickness of the end edges 6 and 10 should be preserved so that in slicing the vegetables, the paring edge will not interfere therewith. By concavely grinding the rear portion of the underside of the knife not only an edge is produced which does not project from the knife blade, but a concave seat 12 is produced which enables the knife to be tilted back on the vegetable, giving more efficient paring, since the cutting edge of the knife is thus raised and does not chip off any of the material pared, renders visible to the operator the entire paring operation. The portions of the blade adjacent the edges 6 and 10 of the slot should have the maximum thickness in the blade so that the paring edge will not interfere with the slicing performed with the knife edge 3. The portion of the knife in front of the paring edge is also concave so that the flat portions of the vegetables may be pared.

The tongue-like member 4 which is stamped out of the blade is turned back towards the end of the handle in such a way that it presents an arcuate form and the bend 11 of the arc may be made abrupt and sharpened in the direction of the cutting and paring edges so that a means for gouging out the eyes and faulty portions of vegetables is produced. The form which this member may take is not arbitrary and it may be designed to cut out small or larger portions of the vegetable surface. The preferred form of this tongue member is that wherein it tapers towards the end since this makes it possible to produce a tapered slot and a tapered member all in one operation. However, other forms may be stamped out without departing from the spirit of my invention. The entire strip stamped out may be used or it may be shortened if convenience and arrangement requires it.

The slot 5 is shown to be tapered and this form is preferred because it renders it possible to gauge the size of the paring since the thickness of surface cut depends on the size of the slot. At the narrow end a thin paring may be had and the thickness of the paring progressively increases as the broad end of the slot is approached.

As described, the improved paring knife is made by stamping out the tapered tongue-like member which is bent away toward the handle of the knife, next stamping downwardly a portion of the edge of the slot nearest the back of the knife. This latter stamping operation may be omitted and the edge remaining after cutting out the tongue-like member may be sharpened to a cutting edge 14 as shown in the modification illustrated by Fig. 4. On the underside of the knife, the portions of the surface on each side of the paring edge may be concavely ground, or only that portion of the surface rearwardly of the paring edge need be concavely ground to form a seat that a better grip and cutting ability may be secured. In any case, the paring edge will not project beyond the portions of the knife having the maximum thickness which portions may conveniently be those adjacent the end edges 6 and 10 of the slot.

The manner of using the article is clear upon inspection of the same. It will be noted that the slicing, paring and gouging operations may all be successively carried on without shifting the knife in the hand or reversing the position of the knife. In other words, these three cutting edges are unidirectional. The knife is placed upon the vegetable at the region of the concave seat, with the paring edge directed towards the operator and by slightly tilting back the knife until the vegetable surface conforms to the seat, the paring is then accomplished in the usual way. The slicing is done in the usual way. As for the gouger, the method of use depends on the person, but since it is in the nature of a circular knife, the average person would discern the method of use upon observation. In use it will be noted that the portion of the knife in front of the paring edge acts as a guard to prevent the paring edge from going down too far into the vegetable.

All that has been said above in the description of my preferred embodiment is offered by way of illustration and not limitation. I do not wish to be limited to the exact structure of the preferred embodiment shown and described, or to any particular material used in the construction of the parts, but desire protection as against any variations in structure which utilize the principle of my invention and fall within the purview of my invention and are within the spirit and scope of the following claims.

What I claim as new is:

1. A paring knife comprising a blade, said blade having a slot therein, one of the longer edges of said slot being provided with a paring edge, said blade having a concave depression on its underside adjacent the paring edge.

2. A paring knife comprising a blade, said blade having a slot therein, one of the longer edges of said slot being provided with a paring edge, said blade having a concave depression on each side of said paring edge, said concave depression being so disposed that they meet in a line substantially in alignment with the paring edge, the portions of said blade adjacent the ends of said slot having the maximum thickness of the blade.

3. A paring knife comprising a blade, said blade having a slot stamped therein, and integral gouging means formed from the material stamped out of said slot at one of the smaller edges of said slot.

4. A paring knife comprising a blade, said blade having a slot stamped therein, integral gouging means formed from the material stamped out of said slot at one of the smaller edges of said slot, said gouging means comprising an arcuate member.

5. A paring knife comprising a blade, said blade having a slot stamped therein, one of the longer edges of said slot being provided with a paring edge, gouging means on said blade, said gouging means comprising an arcuate member integral with said blade at one of the smaller edges of said slot and formed of the material stamped out of the slot.

6. A paring knife comprising a blade, a cutting edge on said blade, said blade having a tapered slot therein, a paring edge within said slot in the same direction as the cutting edge on said blade, a concave depression on each side of the paring edge, said concave depressions meeting on a line substantially in alignment with the said paring edge, the portions of said knife blade adjacent the ends of said slot having the maximum thickness of said blade, an arcuate gouging member integral with said slot nearer the handle portion of said blade, said arcuate gouging member having a cutting edge in the same direction as the cutting and paring edges.

Signed at Fall River, in the county of Bristol, State of Massachusetts, this fifth day of April, 1926.

JOHN F. COX.